(12) United States Patent  (10) Patent No.: US 7,761,580 B2
Zou  (45) Date of Patent: *Jul. 20, 2010

(54) SYSTEM AND METHOD FOR DETERMINING A DESIGNATED CONNECTION BETWEEN COMPONENTS OF COMPUTING DEVICES

(75) Inventor: Bo Zou, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 123 days.

This patent is subject to a terminal disclaimer.

(21) Appl. No.: 12/233,909

(22) Filed: Sep. 19, 2008

(65) Prior Publication Data

US 2009/0024744 A1  Jan. 22, 2009

Related U.S. Application Data

(63) Continuation of application No. 11/038,229, filed on Jan. 21, 2005, now Pat. No. 7,444,409.

(51) Int. Cl.
 *G06F 15/16* (2006.01)
(52) U.S. Cl. .................................... 709/227; 709/228
(58) Field of Classification Search ......... 709/200–203, 709/217–227, 228–229
 See application file for complete search history.

(56) References Cited

U.S. PATENT DOCUMENTS

| | | | |
|---|---|---|---|
| 5,835,724 A | 11/1998 | Smith | |
| 6,671,273 B1 | 12/2003 | Beck | |
| 6,967,955 B1 | 11/2005 | Puntambekar et al. | |
| 7,260,596 B1 | 8/2007 | Zhou | |
| 7,420,966 B2 * | 9/2008 | Arts et al. ................... | 370/360 |

(Continued)

FOREIGN PATENT DOCUMENTS

EP  1487181  12/2004

(Continued)

OTHER PUBLICATIONS

Canadian First Office Action. Application No. 2,532,995. Dated: Jan. 8, 2009.

(Continued)

*Primary Examiner*—Moustafa M Meky
(74) *Attorney, Agent, or Firm*—Bereskin & Parr LLP/S.E.N.C.R.L., s.r.l

(57) ABSTRACT

A system and method for identifying a single, designated connection from one or more connections (e.g. TCP connections) that may have been established between two components for data communications. Each component is associated with a component identifier that is generated by an identifier generating algorithm adapted to ensure that component identifiers generated by the algorithm are orderable and substantially unique. For example, Universally Unique Identifiers may be generated for this purpose. Each component in the distributed system can be uniquely identified by its component identifier, and the component identifiers facilitate the identification of each component as either a controller or responder in a determination of whether a particular connection should be identified as the designated connection. In one embodiment, that particular connection is identified as the designated connection unless an earlier established connection exists that neither the first component nor the second component knows to be broken. In that case, the earlier established connection may be identified as the designated connection.

24 Claims, 5 Drawing Sheets

U.S. PATENT DOCUMENTS

| | | | |
|---|---|---|---|
| 7,444,409 B2 * | 10/2008 | Zou | 709/227 |
| 2003/0217139 A1 | 11/2003 | Burbeck et al. | |
| 2004/0092231 A1 | 5/2004 | Ayatsuka et al. | |
| 2004/0254977 A1 | 12/2004 | Zhang | |
| 2006/0018264 A1 | 1/2006 | Yamakawa | |

FOREIGN PATENT DOCUMENTS

| | | |
|---|---|---|
| JP | 11275106 | 10/1999 |
| JP | 2000151892 | 5/2000 |
| JP | 2001045207 | 2/2001 |
| JP | 2003258825 | 9/2003 |
| JP | 2004199349 | 7/2004 |
| JP | 2004350297 | 12/2004 |
| KR | 1020040101050 | 12/2004 |
| WO | 03038635 | 5/2003 |

OTHER PUBLICATIONS

Steven Hessing: "Peer to Peer Messaging Protocol (PPMP)", Internet-Draft, Apr. 2002 (2002-04), pp. 1-57, XP015001173. 7. Connection Setup and maintenance; 7.1. Bidirectional Connections; 7.1.4. Breaking bi-directional Connection Collision.

Co-pending U.S. Appl. No. 11/038,229, "System and Method for Determining a Designated Connection Between Components of Computing Devices", filed Jan. 21, 2005. (File History retrievable from PAIR). Claims 1-2, 4-14 and 16-25 are allowed.

Communications (English translation) dated Feb. 14, 2007 and Oct. 5, 2007 for corresponding issued Korean Patent No. 0788851.

Communications dated Mar. 30, 2007, Aug. 17, 2007 and Jan. 9, 2008 for corresponding issued Australian Patent No. 2006200249.

Communications dated Jun. 30, 2005, Jan. 30, 2006 and Aug. 18, 2006 for corresponding issued European Patent No. 1684481.

Communications (English translation) dated May 14, 2008 for corresponding co-pending Taiwanese Patent Application No. 094147309.

Communications (English translation) dated Jan. 4, 2008 for corresponding co-pending Chinese Patent Application No. 200510137863.4.

Communications dated Oct. 2, 2006 and Jul. 19, 2007 for corresponding co-pending Singapore Patent Application No. 200508050-2.

Japanese First Office Action (English translation). Application No. 2005-366433. Dated: Oct. 10, 2008.

Chinese Notification of Grant of Rights for Invention Patent (English translation) and Notification of Completion of Formalities for Registration (English translation). Application No. 200510137863.4. Dated: Oct. 31, 2008.

Indian First Examination Report. Application No. 75/DEL/2006. Dated: Sep. 16, 2008.

Taiwanese Notice of Allowance. Application No. 094147309. Dated: May 23, 2008.

Japanese Notice of Allowance. Application No. 2005-366433. Dated: Feb. 2, 2009.

Canadian Notice of Allowance. Application No. 2,532,995. Dated: Mar. 17, 2010.

\* cited by examiner

SYSTEM AND METHOD FOR DETERMINING A DESIGNATED CONNECTION BETWEEN COMPONENTS OF COMPUTING DEVICES

CROSS-REFERENCE TO RELATED APPLICATION

This application is a continuation of prior application Ser. No. 11/038,229, filed Jan. 21, 2005, and issued to patent as U.S. Pat. No. 7,444,409, the contents of which are hereby incorporated by reference.

TECHNICAL FIELD

Embodiments described herein relate generally to data communications between components of computing devices, and more specifically to a system and method for identifying a connection between the components to be used for such communications.

BACKGROUND

In a typical distributed computing environment, different components and objects that comprise one or more applications reside on different computing devices, connected to each other in a network. Information and processing capability may be distributed amongst the computing devices in the network, and each of the computing devices may be permitted access to the others as needed. Components may communicate with each other through a connection for data communications (e.g. a Transmission Control Protocol (TCP) connection), or using some other communications protocol (e.g. User Datagram Protocol (UDP)).

Consider, for example, the situation where peer-to-peer (P2P) communication is to take place between two components residing on different computing devices. A connection may be established between the two components to facilitate communications. Since the components are in a peer-to-peer relationship and not in a client-server relationship, both components have equal status in the arrangement and each of the two components is independently capable of initiating the establishment of such connections. Since each of the two components may establish a connection with the other independently, it is possible that multiple connections between the same two components may be established and may exist simultaneously.

However, managing multiple connections between the two components may be unnecessary and may result in a waste of resources, particularly when each of the connections is adapted to facilitate bi-directional data communications (e.g. TCP).

BRIEF DESCRIPTION OF THE DRAWINGS

For a better understanding of embodiments described herein, and to show more clearly how they may be carried into effect, reference will now be made, by way of example, to the accompanying drawings in which.

DETAILED DESCRIPTION

Figure 1:
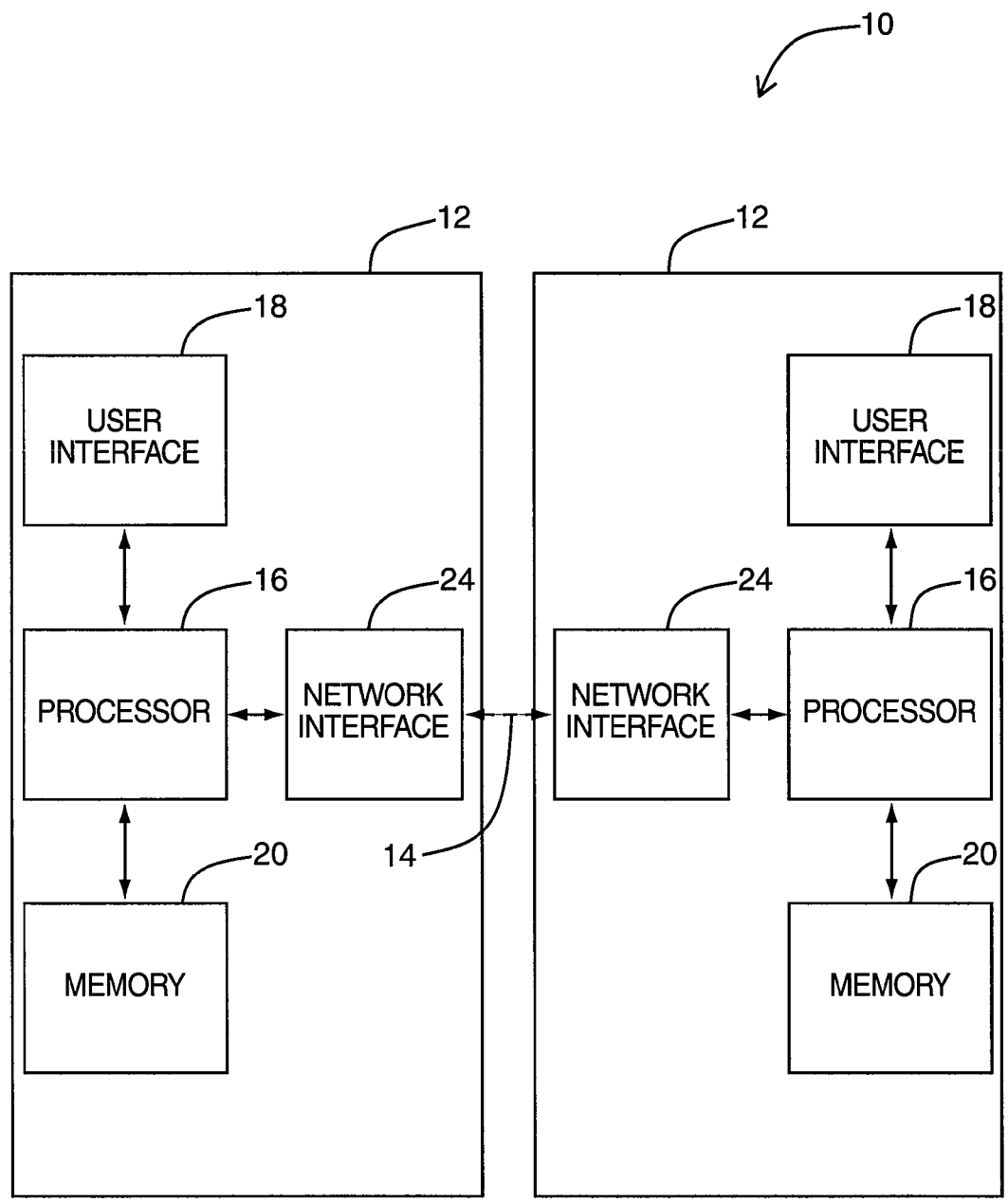
FIG. 1 is a schematic diagram illustrating a subset of elements of computing devices in an example network configuration.

In a broad aspect, there is provided a system for determining a designated connection between a first component residing on a computing device and a second component residing on a computing device, each component capable of initiating the establishment of connections that facilitate data communication to the other, wherein the system comprises a first application and a second application associated with the first and second components respectively, and wherein the first and second applications are programmed to co-operate to perform the steps of: generating a component identifier for each of the first and second components in accordance with an identifier generating algorithm; identifying a current connection between the first and second components; transmitting and receiving component identifiers between each of the first and second components to and from the other; comparing the component identifiers for the first and second components to identify one of the first and second components as a controller and the other as a responder; and determining a designated connection between the first and second components, the step initiated by the component identified as the controller and comprising the substeps of determining whether at least one connection other than the current connection exists between the first and second components that neither the first component nor the second component knows to be broken, if the at least one connection other than the current connection does not exist, identifying the current connection as the designated connection, and if the at least one connection other than the current connection exists, identifying a connection as the designated connection from a group that includes the current connection and the at least one connection other than the current connection; wherein the identifier generating algorithm is adapted to ensure that component identifiers generated by the algorithm are orderable and substantially unique.

In another broad aspect, there is provided a method of determining a designated connection between a first component residing on a computing device and a second component residing on a computing device, each component capable of initiating the establishment of connections that facilitate data communication to the other, and wherein the method comprises the following steps performed at each of the first and second components: generating a component identifier for the respective component in accordance with an identifier generating algorithm; identifying a current connection between the respective component and the other of the first and second components; transmitting the component identifier for the respective component to the other component, and receiving a component identifier for the other component from the other component; performing a comparison of the component identifiers for the respective component and the other component, to identify the respective component as one of a controller and a responder; and determining a designated connection between the respective component and the other component, the step initiated by the respective component if the respective component is identified as the controller and comprising the substeps of determining whether at least one connection other than the current connection exists between the respective component and the other component that neither the respective component nor the other component knows to be broken, if the at least one connection other than the current connection does not exist, identifying the current connection as the designated connection, and if the at least one connection other than the current connection exists, identifying a connection as the designated connection from a group that includes the current connection and the at least one connection other than the current connection; wherein the identifier generating algorithm is adapted to ensure that component identifiers generated by the algorithm are orderable and substantially unique.

Embodiments described herein relate generally to a technique for determining a single, designated connection to be used for peer-to-peer communications between two components, each residing on a computing device. More specifically, embodiments described herein are generally directed to a technique for identifying a designated connection from one or more connections that may have been established between the two components.

Where the relationship between the two components is peer-to-peer, it is possible that two (or more) connections may be established between them. In order for one connection to be determined as the designated connection, a reliable way of choosing the connection to be selected is required. To facilitate this, in accordance with at least one embodiment, each component is associated with a component identifier that is generated by an identifier generating algorithm adapted to ensure that component identifiers generated by the algorithm are orderable and substantially unique. This allows a comparison of the component identifiers for any two given components in a distributed system to be made, and allows one component to be identified as a controller and the other component to be identified as a responder. Therefore, when a method of determining a designated connection is performed, serialization of operations can be enforced and race conditions that might otherwise be caused by the two components can be avoided, with each component maintaining its role as controller or responder throughout the performance of the method.

Furthermore, in order for one connection to be determined as the designated connection, a reliable way of tracking connections that have been established between a given component and other components is required. The component identifier with which each component is associated allows components in a distributed system to be easily identified for this purpose. Since the component identifiers generated by the identifier generating algorithm are orderable and unique, each component in the distributed system can be uniquely identified.

In one embodiment, each component identifier is a Universally Unique Identifier (UUID). In contrast, an Internet Protocol ("IP") address or identifier, for example, would not be reliable for the purpose of tracking connections between two specific components, as an IP identifier may be unable to uniquely identify each component in the distributed system. For example, a computing device can host multiple components, and therefore, different components may be assigned the same IP identifier. Moreover, any given component may be assigned multiple IP identifiers.

In one embodiment, each connection that is established between the two components is a TCP connection. While peer-to-peer communications may be implemented using other communication protocols (e.g. UDP), the functionality provided by TCP with respect to flow control, network adaptation, and ensuring reliable delivery of transmitted data, for example, may provide particular benefits where TCP connections are employed. Furthermore, TCP almost always operates full-duplex, in that bi-directional data communications are supported. In contrast to an implementation where two TCP connections between two components are used for data communications (e.g. where one TCP connection is used for data transmission for each direction), the use of a single, designated TCP connection can simplify software application development, making it easier to monitor traffic between a given component and other components, and making it easier to manage the establishment and termination of connections between those components.

Referring now to FIG. 1, a schematic diagram illustrating a subset of elements of computing devices in an example network configuration is shown generally as 10.

In the example network configuration 10, two computing devices 12 are connected to each other by a network connection 14 over which computing devices 12 can communicate. Although only two computing devices are shown in network 10 of FIG. 1, more than two computing devices may be connected in a network, and they may be arranged in any of a number of network topologies in variant implementations. It will be understood by persons skilled in the art that network connection 14 need not be a wired connection, as any given connection in the network may instead be a wireless communication link, for example. It will also be understood that other devices may be connected either directly or indirectly to computing devices 12 in network 10 that are not shown in FIG. 1.

A subset of elements of each computing device 12 is shown in FIG. 1. It will be understood by persons skilled in the art that the elements shown in FIG. 1 are provided by way of example only, and computing device 12 will generally comprise other elements in addition to those shown in FIG. 1. Each computing device 12 comprises a processor 16, an optional user interface 18 for receiving user input and/or providing output, memory 20, and a network interface 24 that facilitates network communications with other computing devices in network 10. Processor 16 executes instructions in accordance with system software and other applications residing in memory 20. It will be understood that the term "memory" as used herein is not limited to a single storage device and may comprise volatile and non-volatile memory elements, as well as secondary storage elements, residing on computing device 12 or otherwise coupled thereto.

Figure 2:
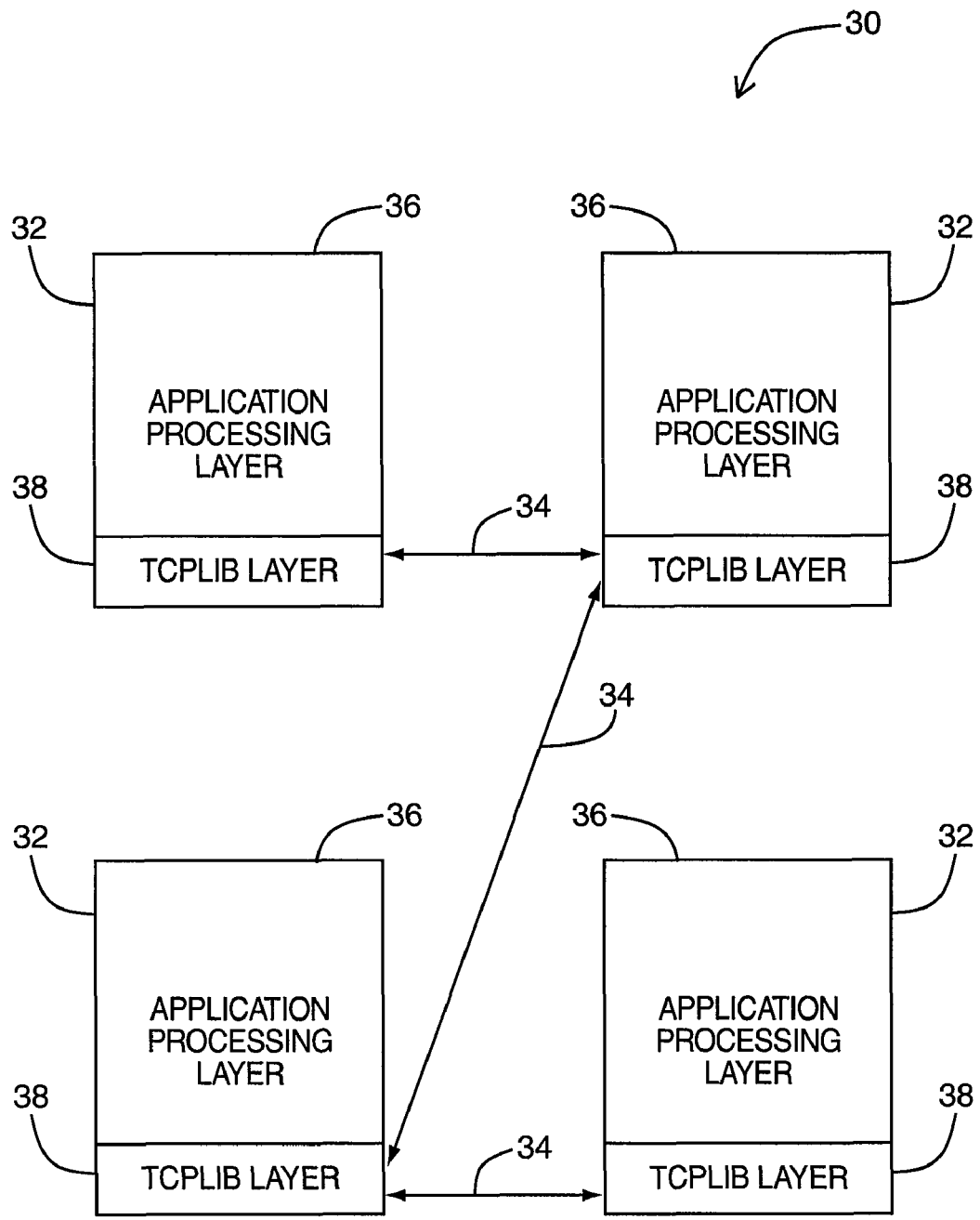
FIG. 2 is a schematic diagram of an example of a distributed system comprising four components.

Referring to FIG. 2, a schematic diagram of an example of a distributed system comprising four components is shown generally as 30.

In FIG. 2, distributed system 30 comprises four components 32 that have connections 34 for data communications established between them. In this example implementation, connections 34 are TCP connections. It will be understood by persons skilled in the art that distributed system 30 may comprise more or less connected components 32, and that connections 34 may be of different types in variant implementations.

It will be understood by persons skilled in the art that a "component" as described herein need not refer to a particular computing device, machine, or device associated with an IP identifier, for example. In at least one embodiment, a "component" is a process executing on a computing device. For instance, in the example of FIG. 2, each component 32 is a process executing on a computing device (e.g. computing device 12 of FIG. 1). In this specification and in the claims, a component 32 that is a process executing on a particular computing device is considered to reside on that computing device.

Several components 32 may reside on the same computing device or on different computing devices. For instance, in the example of FIG. 2, the two leftmost components 32 shown schematically in the Figure may reside on one computing device while the two rightmost components 32 shown schematically in the Figure may both reside on a different computing device. Where two given components 32 reside on different computing devices and are to communicate with each other, a connection 34 may be established between them for this purpose. In one embodiment, peer-to-peer communications between components 32 that reside on different computing devices take place via connections 34.

Although the embodiments herein, provided by way of example, are described as relating generally to connections between components that reside on different computing devices, in variant embodiments, a connection 34 may also be established between components 32 residing on the same computing device. For example, TCP may also be used to connect components residing on the same computing device, as it may also function as an interprocess protocol. In this case, TCP may interface with users and applications through an interface (e.g. a loop-back interface) that consists of a set of calls that are similar to the calls that an operating system provides to an application process for manipulating files.

In one embodiment, each component 32 is a process that may be considered as having at least two layers: an application processing layer 36 and a TCP library (TCPLIB) layer 38. The TCPLIB layer 38 of a component 32 is used to set up an actual TCP connection 34 between the component 32 and another component when such a connection is required for use by the application processing layer 36. The components 32 can then communicate with each other over the established connections 34.

In accordance with one embodiment, a method of determining a designated connection between two components 32, as will be described with reference to FIGS. 3A and 3B for example, can be implemented to ensure that only one TCP connection 34 is used to facilitate data communications between any two given components 32. In the example of FIG. 2, the method is implemented through the TCPLIB layer 38 of the components 32. The application processing layer 36 of a particular component 32 uses the respective designated TCP connection 34 set up by the TCPLIB layer 38 of that component 32 to communicate with another component 32 in distributed system 30.

Figure 3A:
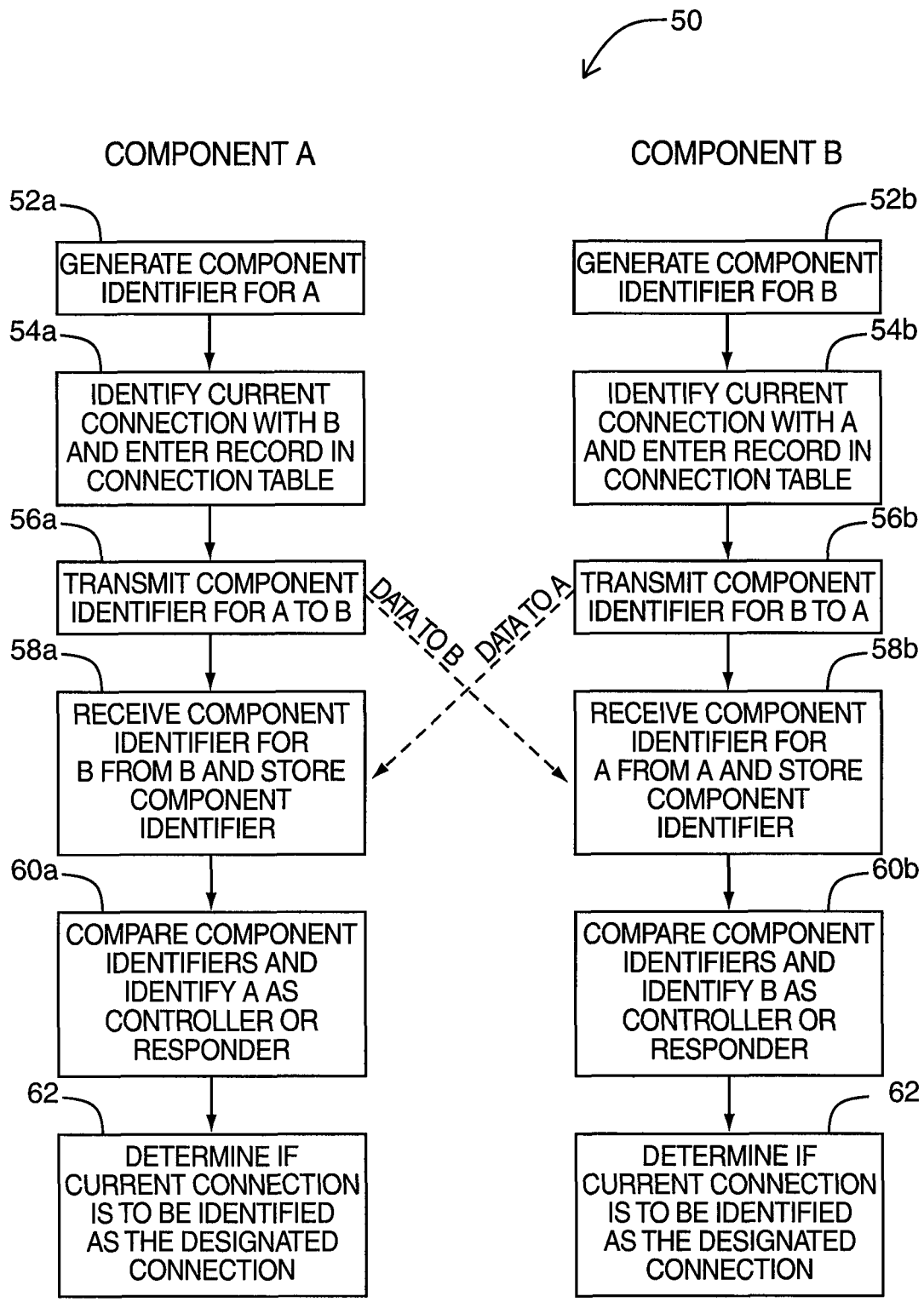
FIGS. 3A and 3B are flowcharts that illustrate steps in a method of determining a designated connection between a first component and a second component in an embodiment.

Referring to FIG. 3A, a flowchart illustrating steps in a method of determining a designated connection between a first component and a second component in one embodiment is shown generally as 50.

Method 50 is directed to a technique for determining a single, designated connection to be used for peer-to-peer data communications between two components (e.g. component 32 of FIG. 2). In this embodiment, each of the two components resides on a different computing device (e.g. computing device 12 of FIG. 1); however, as noted above, in variant embodiments, the two components may reside on the same computing device.

The components are in a peer-to-peer relationship, and each of the two components is independently capable of initiating the establishment of a connection to the other. In this embodiment, connections established between the two components are TCP connections.

In one example software implementation, each of the first and second components is implemented as a process on a computing device, as generally described with reference to FIG. 2. In particular, each process is an executing instance of an application that has been programmed to perform the steps of method 50 that are to be carried out by the respective process on the respective computing device. Further, the applications are programmed to co-operate in order to exchange data between the first and second components and perform the necessary processing at each of these components, in order to facilitate the identification of a single connection between the components as the designated connection.

Some of the steps of method 50 are performed at the first component (identified as component "A"), while other steps of method 50 are performed at the second component (identified as component "B"), as shown in FIG. 3A and as described in further detail below.

At step 52a, a component identifier is generated for component A in accordance with an identifier generating algorithm that is adapted to ensure that component identifiers generated by the algorithm are orderable and unique. Similarly, at step 52b, a component identifier is generated for component B in accordance with the same identifier generating algorithm. These component identifiers will typically be stored in memory (e.g. memory 20 of FIG. 1) of the computing device (e.g. computing device 12 of FIG. 1) on which the respective component resides. These component identifiers may be generated upon activation of the TCPLIB layer (e.g. 38 of FIG. 2) of each component, for example. In this embodiment, a component identifier is to be generated for each component, and remains associated with the respective component for its entire lifetime.

In one embodiment, each component identifier is generated in accordance with an algorithm adapted to generate Universally Unique Identifiers (UUIDs), also known as Globally Unique Identifiers (GUIDs). A number of known UUID specifications and formats exist, including the Open Software Foundation's (OSF) (currently known as The Open Group) Distributed Computing Environment specification, for example.

A UUID is typically a 128-bit long identifier that requires no central registration process. A UUID is substantially unique across both space and time, with respect to the space of all UUIDs. Each UUID is considered to be "substantially" unique as it is possible for UUID values to rollover (e.g. around A.D. 3400, depending on the specific algorithm used). However, for practical purposes, each generated UUID can be considered to be unique.

While the concept of UUIDs is generally known, the UUIDs are used in a novel and inventive manner in this embodiment to uniquely identify components in a distributed system and to facilitate the identification of designated connections between components. Each component (e.g. process) in the distributed system may be assigned one UUID for the term of its life. These unique identifiers enable components to be uniquely identified, irrespective of whether the components reside on the same computing device or whether the components are associated with the same IP identifier.

UUIDs are typically of a fixed size that is reasonably small relative to other alternative identifiers, and accordingly, they are easily sorted, ordered, and stored, for example. Since the UUIDs are orderable, this allows a component that has had a UUID associated with it to be assigned a relative rank or position vis-à-vis other components. In this embodiment, as between two components for example, the UUIDs facilitate the consistent identification of one component as a controller and the other component as a responder in the performance of method 50. Accordingly, situations where both components compete to perform specific steps or tasks can be avoided.

In one embodiment, a connection table is maintained by each component (e.g. in memory 20 of the computing device 12 upon which the component resides as shown in FIG. 1) of the distributed system to store data for tracking all connections connected to the respective component. In variant embodiments, other data structures may be used to store information associated with the connections.

More specifically, the connection table maintained by each component stores, for each connection, the component identifier (e.g. UUID) of the component to which the respective component is connected, an identifier associated with the connection itself (e.g. a socket handle for the TCP connection), and a status flag. At any given time, the status flag may be set to one of three values: "created", "pending", or "connected", in this embodiment. Different values may be assigned to the status flag, and other connection data may also be stored in the connection table in variant embodiments.

When a connection is established between any two components at the TCP level, as may be initiated by either of the two components, steps 54a and 54b are performed. At step 54a, at component A, the TCP connection that has been established with component B is identified, and a record is created in the connection table maintained by component A. This record includes the connection's identifier, and the status flag is set to "created".

Similarly, at step 54b, the connection is also identified at component B, and a record is created in the connection table maintained by component B. This record also includes the connection's identifier, and the status flag is set to "created".

Performance of subsequent steps of method 50 is triggered by the establishment of the connection identified at component A (step 54a) and at component B (step 54b). In respect of the present instance of method 50, the connection is referred to as the "current" connection.

It will be understood by persons skilled in the art that multiple instances of method 50 may be performed concurrently where multiple established connections can co-exist. Consider an example scenario where a first connection is established (e.g. at the TCP level) between two components. This first connection would be identified at steps 54a and 54b by the two components in a first instance of method 50, and at each component, the existence of this first connection is recorded in the connection table maintained by the respective component, with this first connection being initially flagged as "created". Performance of subsequent steps of this first instance of method 50 (e.g. 56a/56b to 62) is triggered so that a determination of whether this first connection should be identified as the designated connection can be made.

Now suppose that a second connection between the same two components were to be established while the determination with respect to the first connection is still pending. A number of steps of a second instance of method 50 may be performed while the first instance of method 50 continues to be performed. For example, the second connection would be identified at steps 54a and 54b by the two components in the second instance of method 50, and at each component, the existence of this second connection is recorded in the connection table maintained by the respective component, with the second connection being initially flagged as "created". Performance of subsequent steps of this second instance of method 50 is triggered so that a determination of whether this second connection should be identified as the designated connection can be made. As the first connection takes the role of the "current" connection in respect of the first instance of method 50, the second connection takes the role of the "current" connection in respect of the second instance of method 50.

Similarly, further instances of method 50 may be performed with respect to additional connections concurrently as further connections are established, and each of those additional connections will take the role of the "current" connection in respect of its own instance of method 50.

While certain steps of multiple instances of method 50 may be performed concurrently, step 52a will be performed only once by component A and step 52b will be performed only once by component B, since only one component identifier is to be generated for each component.

Referring again to FIG. 3A, at step 56a, the component identifier for component A is transmitted to component B. At step 58b, the component identifier for component A is received by component B and stored in component B's connection table, in the "created" record associated with the current connection. Similarly, at step 56b, the component identifier for component B is transmitted to component A. At step 58a, the component identifier for component B is received by component A and stored in component A's connection table, in the "created" record associated with the current connection. The dashes in FIG. 3A illustrate that there is a first exchange of data (i.e. the component identifiers are exchanged) between components A and B when these steps are performed. In one embodiment, the component identifiers are exchanged over the current connection identified at steps 54a and 54b, although other means for exchanging the component identifiers may be employed in variant embodiments.

At step 60a, at component A, the component identifier for component A is compared to the component identifier for component B received at step 58a, to identify component A as either the controller or the responder in the performance of subsequent steps of method 50. Similarly, at step 60b, at component B, the component identifier for component B is compared to the component identifier for component A received at step 58b, to identify component B as either the controller or the responder in the performance of subsequent steps of method 50. In the specification and in the claims, the component identified as the controller is referred to generally as "the controller", and the component identified as the responder is referred to generally as "the responder", in respect of the particular current connection.

In one embodiment, the component identifiers are UUIDs. Since the UUIDs for components A and B are orderable and unique across the space of all UUIDs, it is possible to consistently identify one component as the controller and the other component as the responder. Any technique to assign the controller and responder roles to the components based on the relative positions of the identifiers in the ordering may be employed, so long as the techniques used at both components provide consistent results.

For example, in one embodiment, the component having the higher-valued UUID as determined by a comparison operation may be identified as the controller, while the component having the lower-valued UUID as determined by the same comparison operation may be identified as the responder. Conversely, the component having the lower-valued UUID may be identified as the controller, while the component having the higher-valued UUID may be identified as the responder in a variant embodiment. In variant embodiments, other techniques and algorithms to assign the controller and responder roles to any two components in respect of a particular connection may be used, and the ordering of component identifiers may be defined in different ways.

At step 62, a determination is made as to whether the current connection is to be identified as the single, designated connection for subsequent data communication between components A and B. This generally requires initially determining whether or not there are any established connections between components A and B, other than the current connection, that neither component A nor component B knows to be broken. If no such connections exist, then the current connection, being the only connection between components A and B not known to be broken, can be identified as the designated connection for subsequent data communication.

On the other hand, if an established connection between components A and B, other than the current connection, exists that is not known to be broken (i.e. by component A, by component B, or by both components), then both the current connection and the other connection are candidates for the designated connection, and a choice must be made to identify either the current connection or the other established connection as the designated connection for subsequent data communication. The other established connection may be a connection that has previously been identified as the designated connection. In one embodiment, the current connection would not be identified as the designated connection if a designated connection between components A and B not known to be broken already exists. However, in variant embodiments, other protocols may be implemented. For example, in variant embodiments, the current connection may always be identified as the designated connection, taking precedence over any earlier established connection.

The connection identified as the designated connection will have its associated record in the connection tables of both components updated (if necessary) to reflect a "connected" status, by setting the status flag for that connection in both tables appropriately. Any other established connection between the two components that is considered as a candidate for the designated connection, but is not ultimately identified as the designated connection, may be terminated at step 62, and the records in the connection tables of both components associated with that terminated connection removed. The terminated connection may include the current connection if it is not identified as the designated connection, or it may include a previously designated connection, for example. A previously designated connection that is terminated may be one that has become broken since it was designated, for example, as discussed in greater detail below.

Referring again to step 62, in one embodiment, the candidates for the single, designated connection are connections that neither component A nor component B knows to be broken. If either component A or component B knows that a particular connection is broken, it would be inefficient to identify that connection as the designated connection for data communication.

The term "broken" is used herein to describe one possible state of connection between two components. A connection between two components, including in particular a designated connection between the components, may become broken in any of a number of ways. For example, a network cable at one of the computing devices on which a component resides may become physically disconnected from the computing device, making it impossible (at least until the network cable is reconnected to the computing device) for data to be communicated between the devices over a connection using that cable. In the normal course of communications between the components, a component may discover the connection to be broken. For example, when an attempt is made by one component to send data to the other component using the connection and where a response from the other component is expected, failure to receive the response in a timely manner may indicate to the component sending the data that the connection is broken. Connections that are discovered by a component to be broken can be terminated unilaterally by that component, and the record of the terminated connection is removed from the connection table maintained by that component [steps not explicitly shown in Figures].

However, depending on whether a given component has made a failed attempt to communicate with the other component or tested a connection while the connection is broken, it is possible that the connection would be known to be broken (and subsequently terminated) by only one of the two components. It is also possible that neither component may know that a connection is broken if no communication by either component has been attempted over that connection while the connection is broken. For the purposes of the specification and the claims, a broken connection is still considered to be a connection between two components, so long as the broken connection is not known to be broken and has not been terminated by at least one of the two components.

Accordingly, in this embodiment, step 62 requires confirmation that a connection that is to be considered as a candidate for the designated connection is one that neither component A nor component B knows to be broken. Referring to FIG. 3B, step 62 of FIG. 3A is described in greater detail as implemented in accordance with one embodiment.

Figure 3B:
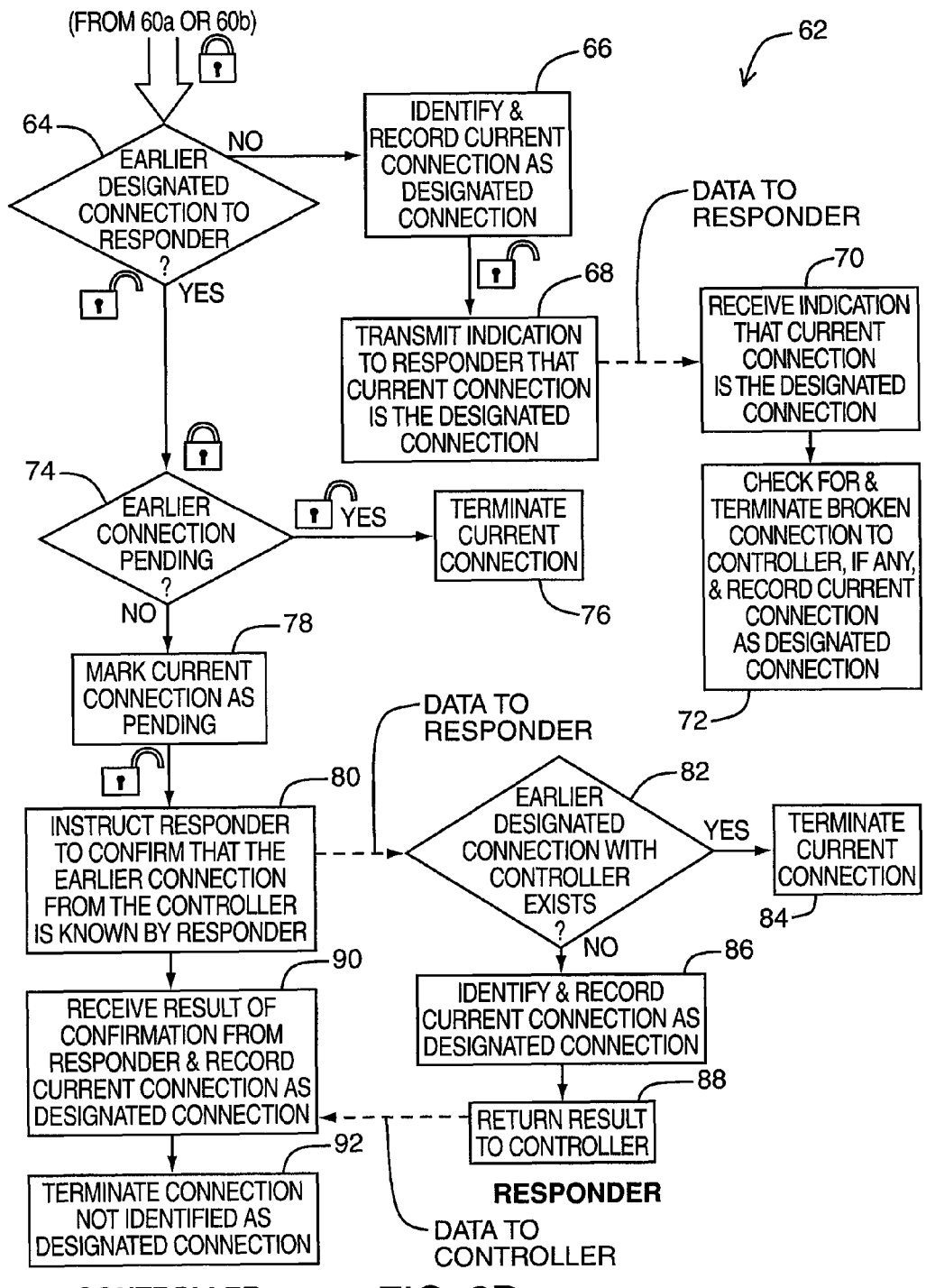

Some of the substeps that comprise step 62 in this embodiment are performed by the component identified as the controller (which is one of component A and component B), while other substeps are performed by the component identified as the responder (which is the other of component A and component B) as illustrated in FIG. 3B. The identification of one of the components as the controller and the other as the responder was performed in steps 60a and 60b of FIG. 3A. As shown in FIG. 3B, the following substeps of step 62 are initiated by the controller.

At substep 64, a determination is made by the controller as to whether an earlier designated connection to the responder is known by the controller to exist (i.e. has not been terminated by the controller). In one embodiment, this substep comprises determining whether a record of a connection, other than the current connection, to a component identified by the UUID of the responder exists in the connection table maintained by the controller, and where the flag for that other connection is set to "connected".

If no earlier designated connection is known by the controller to exist, then the current connection is identified as the designated connection at substep 66, and the record of the current connection to the responder (the responder being identified by the responder's UUID) is updated in the connection table maintained by the controller, with the value of the status flag being changed from "created" to "connected".

Where multiple connections may be established and exist simultaneously, a number of instances of method 50 (and step 62) may be performed concurrently. In this case, implementations of this embodiment should ensure that access to the connection table maintained by the controller in order to make the determination in substep 64 is restricted, and that substeps 64 and 66 are completed in a single transaction if substep 66 is performed, so as to prevent more than one "current" connection from being identified as the designated connection. Different programming constructs may be employed (e.g. locks, etc.) to achieve this control in variant implementations.

An indication that the current connection has been identified as the designated connection is then transmitted to the responder at substep 68. This indication is received by the responder at substep 70 as illustrated by the dashed line, depicting a second transmission of data from component A to component B (the first transmission was part of a data exchange made earlier as discussed with reference to FIG. 3A).

Even where no earlier designated connection is known by the controller to exist, it may be that a broken connection exists, previously detected by the controller and terminated, but which is not yet known by the responder to be broken and has not yet been terminated by the responder. From the responder's point of view, the broken connection may still be the designated connection, and that broken connection may be identified as such in the connection table maintained by the responder. Accordingly, at substep 72, the responder checks whether such a broken connection exists by identifying whether a record of an established connection (other than the current connection) to a component with the same UUID as the controller is recorded and flagged as "connected" in the connection table maintained by the responder. If so, this broken connection can be terminated at substep 72, and the record of the broken connection removed from the connection table. The record of the current connection to the controller in the connection table maintained by the responder is updated, with the value of the associated status flag being changed from "created" to "connected".

Referring again to the determination made at substep 64, if, on the other hand, an earlier designated connection to the responder is known by the controller to exist, then at substep 74, a determination is made as to whether an earlier pending connection to the responder is also known by the controller to exist.

When an earlier designated connection is known by the controller to exist, it may ultimately be replaced by a current connection as the designated connection if the earlier connection is subsequently discovered to be broken (i.e. the responder terminated the connection). Until it is confirmed that the earlier connection is not known by the responder to be broken, the current connection remains an active candidate for the designated connection. However, there may be multiple "current" connections active at a given time, being considered by the controller. Therefore, in one embodiment, at most one of the "current" connections is flagged as "pending", to prevent multiple connections from being identified as the designated connection, in the event that the earlier designated connection is in fact, ultimately discovered to be broken. In effect, the first "current" connection to be flagged as pending will be considered as the "first in line" to replace the earlier connection as the designated connection. All other connections that are neither "pending" nor "connected" would no longer be considered as candidates for the designated connection, and may be terminated.

Accordingly, if an earlier established connection is pending, then the current connection is terminated at substep 76 in favor of the pending connection, and the record of the current connection in the connection table maintained by the controller is removed. When the current connection is terminated by the controller, the underlying TCP will transmit a disconnect signal automatically to the responder, and the current connection will be terminated by the responder, with the record of the current connection in the connection table maintained by the responder being removed [steps not shown].

In this manner, newer connections will typically be eliminated from consideration in favor of earlier established connections, as instances of the steps of method 50 with respect to the earlier connection first flagged as "pending" will continue to be performed. This approach may generally be considered as efficient, since the longest pending connection is likely to be closer to resolution in the determination of the designated connection, relative to more recently established connections.

However, in a variant embodiment, the current connection may be given priority over any earlier established pending or designated connections, with the current connection being identified as the designated connection, and with all earlier pending or designated connections being terminated.

Referring again to FIG. 3B, if it is determined (at substep 64) that an earlier established designated connection known by the controller exists, and that no additional connections are currently pending (as determined at substep 74), then the current connection is marked as pending by updating the value of the associated status flag in the connection table maintained by the controller, from "created" to "pending" at substep 78. Where multiple connections may be established and exist simultaneously, implementations of this embodiment should ensure that access to the connection table maintained by the controller in order to make the determination in substep 74 is restricted, and that substeps 74 and 78 are completed in a single transaction if substep 78 is performed, so as to prevent more than one "current" connection from being identified as a pending connection. Different programming constructs may be employed (e.g. locks, etc.) to achieve this control in variant implementations.

It is noted that between any two given components, it will not be possible that one connection will be considered as pending according to one component's connection table and that a different connection between the same two components will be considered as pending according to another component's table. If this were permitted to occur, then it would be possible that both pending connections may ultimately be identified as the designated connection, which would be an unsatisfactory result. However, this is avoided since orderable and unique identifiers are used to identify all components, and between any two components, one component will always be identified as the controller while the other component will always be identified as the responder vis-à-vis those two components. Accordingly, in method 50, connections will only be marked or flagged as "pending" in the connection table maintained by the controller, at substep 78.

At substep 80, the responder is instructed to confirm that the earlier established connection known by the controller and identified as the designated connection still exists from the responder's perspective.

The confirmation is made by the responder at substep 82, after receiving the instruction from the controller, as indicated by the dashed line representing a first part of a second data exchange between component A and component B (a first data exchange was made earlier as discussed with reference to FIG. 3A). The responder checks its records of existing connections stored in the connection table that it maintains, to determine if a connection to a component with the same UUID as the controller has been flagged as "connected" and has not yet been terminated by the responder. If the earlier designated connection is known by the responder to still exist (i.e. the earlier designated connection is not known by the responder to be broken), then at substep 84, the current connection is terminated in favor of the existing designated connection, and the record of the current connection in the connection table maintained by the responder is removed. When the current connection is terminated by the responder, the underlying TCP will transmit a disconnect signal automatically to the controller, and the current connection will be terminated by the controller, with the record of the current connection in the connection table maintained by the controller being removed [steps not shown].

However, if the earlier designated connection is no longer known by the responder to exist, then at substep 86, the current connection is identified as the designated connection. The record of the current connection to the controller in the connection table maintained by the responder is updated, with the value of the status flag being changed from "created" to "connected". This substep would be performed when the controller has not been made aware that the earlier established connection, which had previously been identified as the designated connection, was broken and subsequently terminated by the responder.

A result of the confirmation that the current connection is to be identified as the new designated connection is returned to the controller at substep 88, which is received by the controller at substep 90, as indicated by the dashed line representing a second part of the second data exchange between component A and component B. The record of the current connection to the responder in the connection table maintained by the controller is updated, with the value of the status flag being changed from "created" to "connected". The previously designated connection, now known to be broken, is terminated at substep 92, and the record of the broken connection is removed from the connection table maintained by the controller.

With reference to FIGS. 3A and 3B, it may be noted that whenever the steps of an instance of method 50 are performed to determine if a particular connection between any two components is to be identified as the designated connection, at most two data exchanges between the components are required to make the determination in accordance with this embodiment. Accordingly, method 50 may be implemented with relatively minimal overhead.

Upon completion of method 50, each component can consult the connection table that it maintains to determine the currently designated connection to any other component (e.g. the other component identified by its UUID, and the connection being flagged as "connected"), and use the designated connection for subsequent data communication to the other component.

Figure 4:
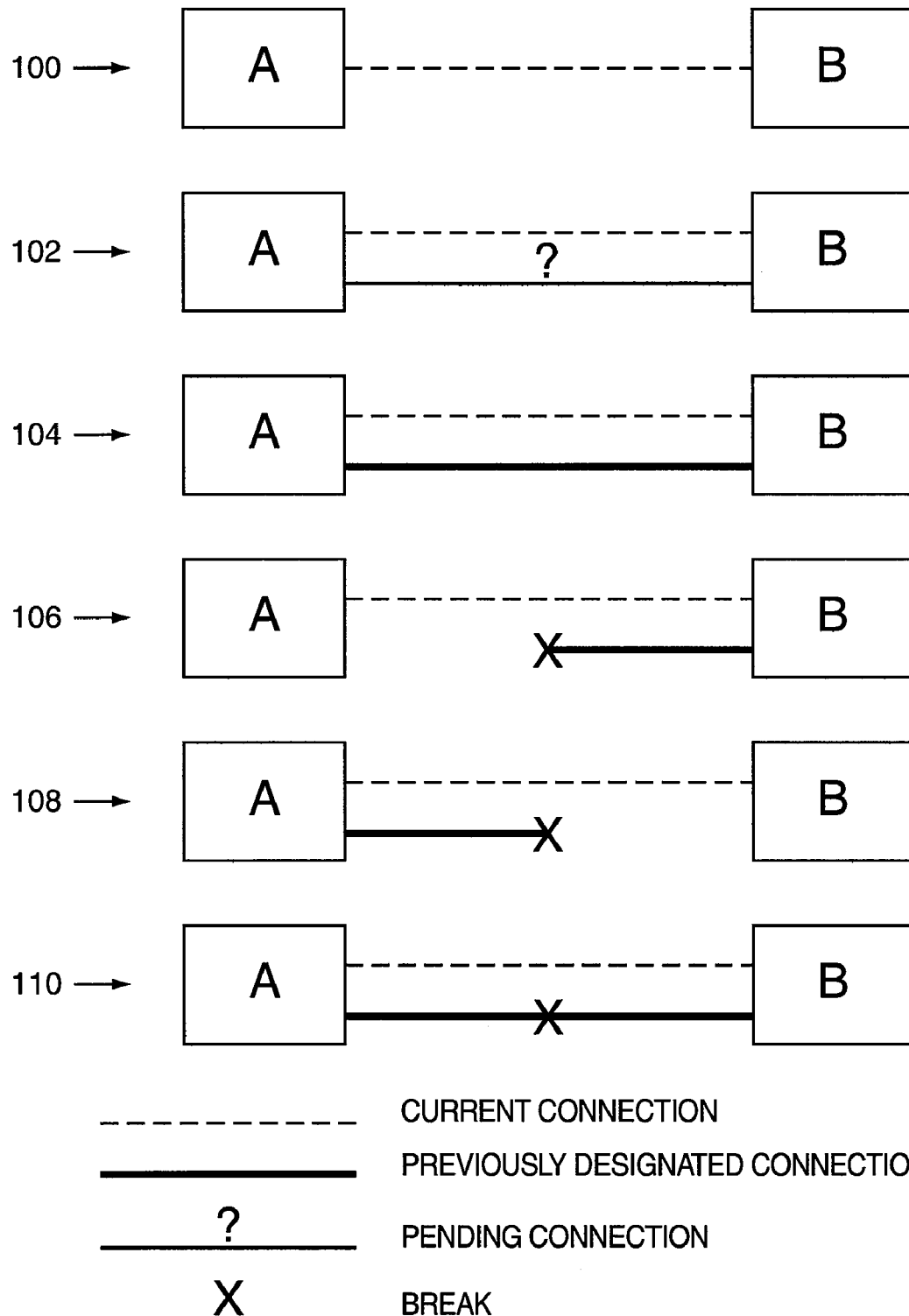
FIG. 4 is a diagram illustrating different examples of connection states between two components.

Referring to FIG. 4, a diagram illustrating different examples of connection states between two components is provided to illustrate the application of method 50 described with reference to FIGS. 3A and 3B in a number of scenarios.

It will be understood by persons skilled in the art that this diagram is provided by way of example only, and other connection states not shown in FIG. 4 are possible in variant embodiments.

Connection state 100 depicts the current connection as being the only connection between components A and B. Application of method 50 in one embodiment will result in the current connection being identified as the designated connection.

Connection state 102 depicts a pending connection between components A and B in addition to the current connection. The pending connection is a candidate for the designated connection in respect of a different instance of method 50, along with a previously designated connection (broken or unbroken) [not shown]. Application of method 50 in one embodiment in respect of the current connection will result in the current connection being terminated in favor of the pending connection. The pending connection may subsequently be identified as the designated connection when method 50 is applied in respect of that pending connection.

Connection state 104 depicts a previously designated connection between components A and B that is not broken, in addition to the current connection. Application of method 50 in one embodiment in respect of the current connection will result in the current connection being flagged as a pending connection by the controller (component A or B depending on their component identifiers), and then subsequently terminated in favor of the existing designated connection.

Connection state 106 depicts a broken connection between components A and B in addition to the current connection, where component B does not know that the connection has been broken and has already been terminated by component A. Application of method 50 in one embodiment will result in the current connection being identified as the designated connection, and the broken connection will be terminated by component B. It is noted that if component B were identified as the controller, then the current connection would be flagged as a pending connection by component B before it is ultimately identified as the designated connection.

Connection state 108 depicts a broken connection between components A and B in addition to the current connection, where component A does not know that the connection has been broken and has already been terminated by component B. Application of method 50 in one embodiment will result in the current connection being identified as the designated connection, and the broken connection will be terminated by component A. It is noted that if component A were identified as the controller, then the current connection would be flagged as a pending connection by component A before it is ultimately identified as the designated connection.

Connection state 110 depicts a broken, previously designated connection between components A and B in addition to the current connection, where neither component A nor component B knows that the connection is broken. This scenario might arise if no communication by either component has been attempted over that connection while the connection is broken, for example. Application of method 50 in the embodiments previously described will result in the current connection being terminated in favor of the broken, previously designated connection. This is not necessarily an unsatisfactory result, as it may be considered reasonable to expect that a previously designated connection should be deemed to be "good" and should continue to be used, until at least one of the components discovers that the connection is actually broken, through the normal course of data communications using the connection.

However, in a variant embodiment, before a current connection is to be terminated in favor of a previously designated connection, the previously designated connection may be tested (e.g. ping/echo) to ensure that it is not broken prior to the termination of the current connection, in the event that the connection has not yet been discovered by either component to be broken. This may require at least one additional data exchange between the two components. In the event that the previously designated connection is discovered to be broken as a result of this test, it can then be terminated in favor of the current connection, which would then be identified as the new designated connection.

The steps of a method for determining a designated connection between a first component and a second component in embodiments described herein may be provided as executable software instructions stored on computer-readable media, which may include transmission-type media.

A number of embodiments have been described herein. However, it will be understood by persons skilled in the art that other variants and modifications may be made without departing from the scope of the embodiments as defined in the claims appended hereto.

The invention claimed is:

1. A computing device comprising a first component capable of initiating the establishment of a connection that facilitates data communication to a second component, said computing device configured to:
   generate a component identifier for the first component in accordance with an identifier generating algorithm;
   identify a current connection between the first and second components;
   transmit the component identifier for the first component to the second component;
   receive a component identifier for the second component;
   perform a comparison based on a relative order position of the component identifiers for the first and second components to identify the first component as one of a controller and a responder; and initiate an establishing of a designated connection between the first and second components if the first component is identified as the controller, said establishing comprising
determining whether at least one connection other than the current connection exists between the first and second components that neither the first and second components knows to be broken,
if said at least one connection other than the current connection does not exist, identifying the current connection as the designated connection, and
if said at least one connection other than the current connection exists, identifying a connection as the designated connection from a group that includes the current connection and the at least one connection other than the current connection;
wherein the identifier generating algorithm is adapted to ensure that component identifiers generated by the algorithm are orderable and substantially unique.

2. The computing device of claim 1, wherein the second component also resides on the computing device.

3. The computing device of claim 1, wherein the second component resides on a second computing device different from the first computing device.

4. The computing device of claim 1, wherein the first component is a process executing on the computing device.

5. The computing device of claim 1, wherein the component identifier generated for the first component is a Universally Unique Identifier.

6. The computing device of claim 1, wherein the first component is identified as the controller if the component identifier for the first component is higher-valued than the component identifier for the second component.

7. The computing device of claim 1, wherein each of the current and designated connections is a Transmission Control Protocol connection.

8. The computing device of claim 1, wherein the connection identified as the designated connection from the group is a connection established before the current connection.

9. The computing device of claim 1, wherein the connection identified as the designated connection at from the group is a connection that has been previously identified as a designated connection.

10. The computing device of claim 1, further configured to:
identify at least one connection not determined as the designated connection, where such at least one connection exists; and
terminate the at least one connection not determined as the designated connection.

11. The computing device of claim 10, wherein the at least one terminated connection comprises a broken connection.

12. The computing device of claim 1, further configures to access a connection table maintained by the first component when performing said determining, wherein the connection table stores data pertaining to connections to other components from the first component.

13. A computer-readable medium upon which a program executable on a computing device is stored, the computing device comprising a first component capable of initiating the establishment of a connection that facilitates data communication to a second component, the instructions for performing acts comprising:
generating a component identifier for the first component in accordance with an identifier generating algorithm;
identifying a current connection between the first and second components;
transmitting the component identifier for the first component to the second component;
receiving a component identifier for the second component;
performing a comparison based on a relative order position of the component identifiers for the first and second components to identify the first component as one of a controller and a responder; and
initiating an establishing of a designated connection between the first and second components if the first component is identified as the controller, said establishing comprising
determining whether at least one connection other than the current connection exists between the first and second components that neither the first and second components knows to be broken,
if said at least one connection other than the current connection does not exist, identifying the current connection as the designated connection, and
if said at least one connection other than the current connection exists, identifying a connection as the designated connection from a group that includes the current connection and the at least one connection other than the current connection;
wherein the identifier generating algorithm is adapted to ensure that component identifiers generated by the algorithm are orderable and substantially unique.

14. The medium of claim 13, wherein the second component also resides on the computing device.

15. The medium of claim 13, wherein the second component resides on a second computing device different from the first computing device.

16. The medium of claim 13, wherein the first component is a process executing on the computing device.

17. The medium of claim 13, wherein the component identifier generated for the first component is a Universally Unique Identifier.

18. The medium of claim 13, wherein the first component is identified as the controller if the component identifier for the first component is higher-valued than the component identifier for the second component.

19. The medium of claim 13, wherein each of the current and designated connections is a Transmission Control Protocol connection.

20. The medium of claim 13, wherein the connection identified as the designated connection from the group is a connection established before the current connection.

21. The medium of claim 13, wherein the connection identified as the designated connection at from the group is a connection that has been previously identified as a designated connection.

22. The medium of claim 13, the acts further comprising:
identifying at least one connection not determined as the designated connection, where such at least one connection exists; and
terminating the at least one connection not determined as the designated connection.

23. The medium of claim 22, wherein the at least one terminated connection comprises a broken connection.

24. The medium of claim 13, further configured to access a connection table maintained by the first component when performing said determining, wherein the connection table stores data pertaining to connections to other components from the first component.

* * * * *